A. B. & M. A. CLIPPINGER.
HAY STACKER.
APPLICATION FILED OCT. 4, 1907.
939,393.
Patented Nov. 9, 1909.
2 SHEETS—SHEET 1.
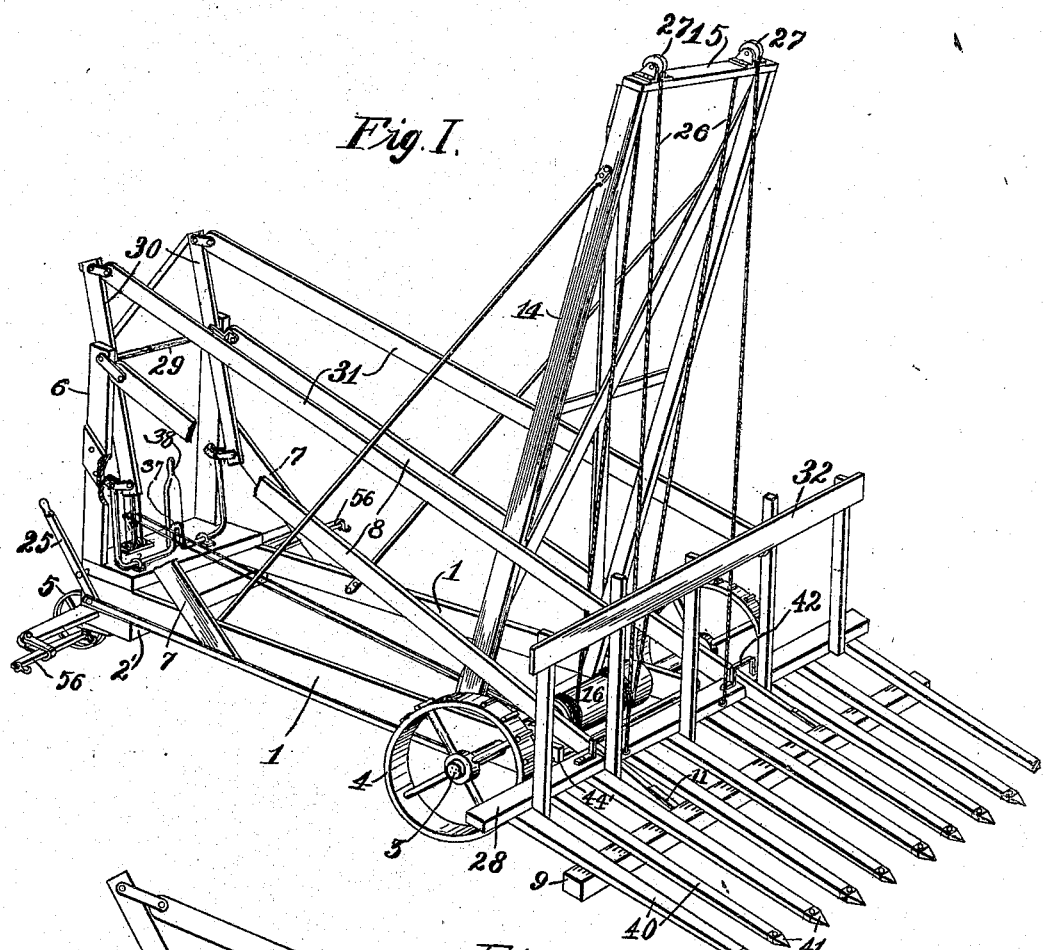
Fig. I.
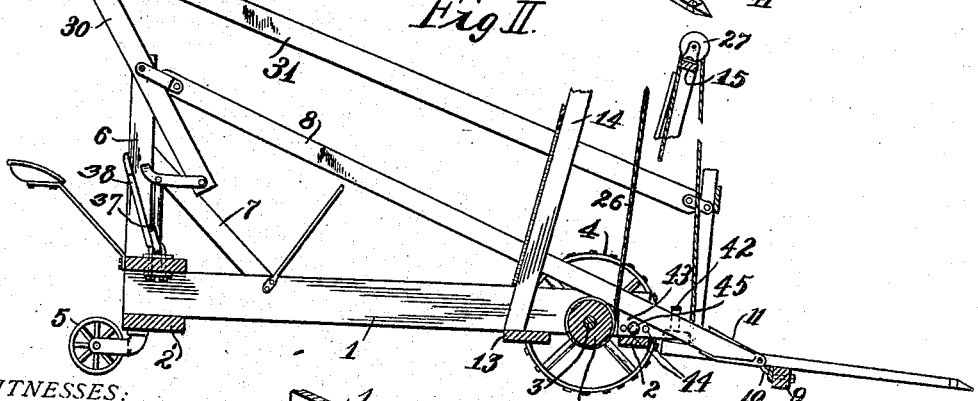
Fig. II.
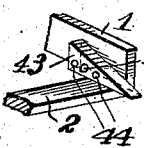
Fig. VIII.
WITNESSES:
E. A. Cahill,
Myrtle M. Jackson.
INVENTORS
A. B. and M. A. Clippinger.
BY Arthur C. Brown,
ATTORNEY.

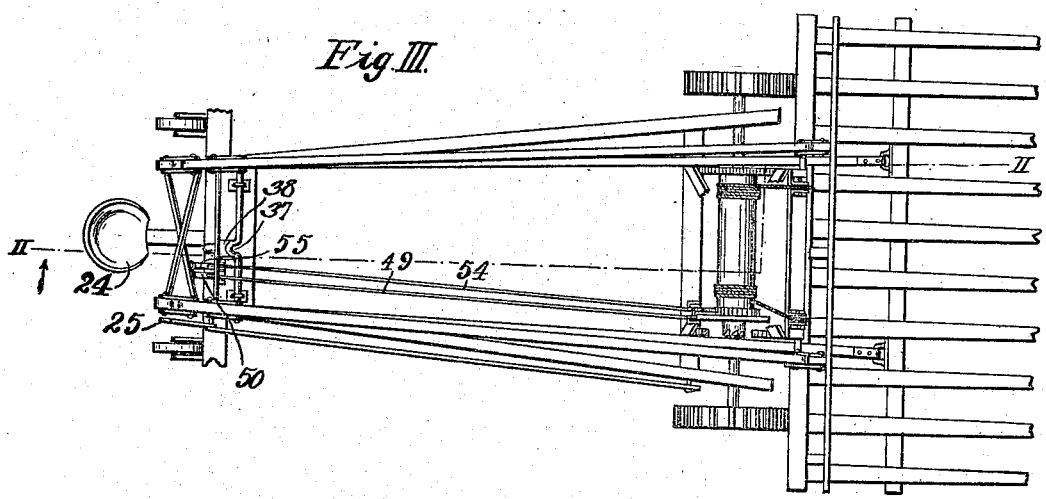
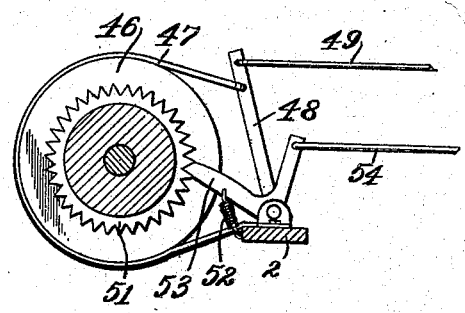
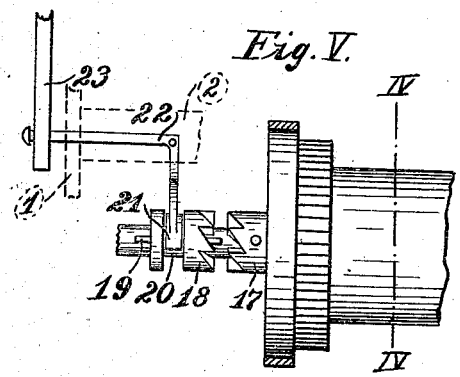
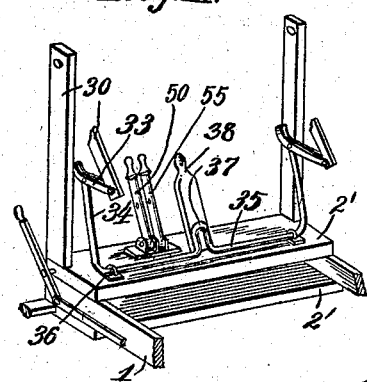

UNITED STATES PATENT OFFICE.

AMOS B. CLIPPINGER AND MAURICE A. CLIPPINGER, OF KANSAS CITY, MISSOURI.

HAY-STACKER.

939,393.  Specification of Letters Patent.  Patented Nov. 9, 1909.

Application filed October 4, 1907. Serial No. 395,926.

*To all whom it may concern:*

Be it known that we, AMOS B. CLIPPINGER and MAURICE A. CLIPPINGER, citizens of the United States, residing at Kansas City, in the county of Jackson and State of Missouri, have invented certain new and useful Improvements in Hay-Stackers; and we do declare the following to be a full, clear, and exact description of the invention, such as will enable others skilled in the art to which it appertains to make and use the same, reference being had to the accompanying drawings, and to the numerals of reference marked thereon, which form a part of this specification.

Our invention relates to a combination hay rake and stacker, and more particularly to a device of that class by means of which loose hay may be gathered from the field, carried to a point adjacent to a stack, and raised above and delivered to said stack; the object of our invention being to provide a device which will perform these functions easily and quickly, and with the least possible strain on the mechanical parts.

A further object is to provide the improved details of structure which will presently be fully described and pointed out in the claims, reference being had to the accompanying drawings forming part of this specification, in which like reference numerals refer to like parts throughout the several views, and in which:—

Figure I is a perspective view of a combination hay rake and stacker constructed according to our invention. Fig. II is a longitudinal, sectional view of the same. Fig. III is a top plan view of the same. Fig. IV is an enlarged view of the elevator drum, in cross section on the line IV—IV, Fig. V, showing the brake and ratchet lock. Fig. V is an enlarged top plan view of a portion of the drum, showing the sliding clutch member and operating mechanism. Fig. VI is an enlarged view, in front elevation, of the lever for rocking the rake tilting arm. Fig. VII is an enlarged perspective view of one of the lever arm joints. Fig. VIII is a perspective view of the triangular block which supports the rocking beam.

Referring more in detail to the parts:—1 designates the longitudinal side frame beams, having the front and rear cross bars 2—2', which comprise the carrying truck. Revolubly mounted in bearings in the forward ends of beams 1 is an axle 3, and rigidly secured on said axle are the traction wheels 4, which support the forward end of the apparatus; the rear end being carried by the caster wheels 5.

Supported on the rear of the truck frame are the standards 6, held rigidly in position by braces 7, and having pivoted to their upper ends the beams 8, which extend forwardly in front of the truck frame and are pivotally secured to the rake cross bar 9; said rake bar having the yoke brackets 10 within which the eye members 11, carried by the forward ends of beams 8, project and to which they are pivotally secured by pins 12.

Supported on a cross bar 13, near the forward end of the truck frame, are the standards 14, which incline forwardly over the front of the frame, and are joined at their upper ends by the bar 15.

Revolubly mounted on axle 3 is a drum 16, having a clutch member 17, adapted to receive a relative member 18, carried by and adapted for longitudinal movement on said axle, but held against revolution thereon by the keys 19; member 18 being provided with a peripheral slot 20, in which are projected the lugs 21 of a rocking lever 22; said lever being pivoted to the cross bar 2, and having an actuating rod 23 extending rearwardly to a point adjacent to the operator's seat 24, where it is provided with a handle 25.

Secured to drum 16 is the cable 26, the ends of which extend upwardly over the sheaves 27 on the cross bar 15 of the forward standards, and thence downwardly to the cross beam 28 of the rake, to which they are anchored.

Revolubly mounted on a rod 29 extending between the upper ends of the rear standards 6, (this rod being preferably the pivot upon which the beams 8 are mounted) are the crank arms 30, to the upper ends of which are pivoted the rake tilting arms 31, said arms 31 being pivoted at their forward ends to the stop frame 32 on the rear of the rake; said stop frame being primarily provided for preventing the hay, when being gathered, from working back onto the truck parts.

To the lower end of each of crank arms 30 is pivoted the forward end of a link 33, the rear ends of said links being pivoted to the arms 34 of an operating crank 35, preferably comprising a round bar, held to the rear truck cross bar 2' by staples 36, and provided with the upturned crook 37 adjacent to the operator's seat, to which the handle 38 is secured; said links having, at their rear ends, the yokes 39 adapted to engage arms 34, to limit the downward swing of the rake.

The rake comprises, besides the cross bars 9 and 28 and the back frame 32 previously mentioned, the rake teeth 40, which rest on bar 9 and beneath bar 28, and carry, at their loose ends, the caps 41, which prevent their pointed ends from digging into the ground when the apparatus is being propelled. To accommodate the rake to the angle of beams 8, the bar 28 is cut through to permit the passage of said beams, as shown, and brackets 42 are made to straddle the breaks and form a rigid unit of the separate pieces.

The rake beams 7 are supported at their forward ends on the triangular blocks 43, which rest on the forward cross bar 2 of the truck frame; said blocks having a series of perforations 44 adapted to register with perforations 44' in the side beams 1, so that the bolts 45 may extend therethrough; in this way permitting the block to be moved forward or back, to adjust the downward limit of the rake; the blocks being anchored by said bolts, when in the desired position.

On drum 16 is a collar 46, around which is extended a metal band 47, one end of which is anchored on cross bar 2, and the other secured to a lever 48 which is pivoted to said bar, there being an actuating rod 49 on said lever, extending rearwardly to a handle 50 located adjacent to the operator's seat; such mechanism serving as a brake to control the drum when the cable is unwound, as will presently be described. Also rigid on drum 16 is a ratchet wheel 51, and normally held in locking engagement with the teeth of said wheel, by a spring 52, is a pawl 53; said pawl being rocked against the tension of spring 52 by an actuating rod 54, which extends rearwardly and is connected with a handle 55, adjacent to the operator's seat.

56 designates swingle trees, which are carried by the truck frame and by which the apparatus is propelled.

When in use, the rake is lowered to the position shown in Fig. 1, and the apparatus propelled through the field until a charge of hay is gathered on the rake teeth. The axle clutch is then thrown into mesh with the clutch member on the drum, and the drum revolved, the cable winding thereon and the rake raised a sufficient distance to clear the loose hay on the ground, when the clutch is released and the apparatus conducted to a point adjacent to the stack, the pawl and ratchet mechanism preventing the drum from revolving backwardly to lower the rake. As the apparatus approaches the stack, the clutch is again thrown into mesh and the rake raised to the top of the frame, as described; the apparatus is then moved against the bottom of the stack and the handle 38 pushed forwardly to rock the levers 31, which in turn tilt the rake and dump the hay therefrom. After the load has been delivered, the rake is again brought to its horizontal position and the truck backed away from the stack so that the rake may be lowered. By releasing the clutch and pawl the weight of the rake will cause the rake. As the apparatus approaches the cable to revolve the drum backwardly and permit the rake to descend, the band 47 being tightened against collar 46 to break the fall of the rake and prevent injury to the parts. After the load has been delivered and before the clutch has been thrown out or the pawl released, the weight of the rake pulling against the drum, will aid in backing the apparatus away from the stack.

Having thus described our invention, what we claim as new therein and desire to secure by Letters Patent is:—

1. In a combination hay rake and stacker, the combination with a truck frame, of rake beams pivotally mounted on said frame, a rake tiltably mounted on said beams, means for elevating said beams and rake, arms pivotally mounted on said frame, tilting arms connected with said arms and with said rake, an operating crank carried by said frame and having upturned portions, links connecting said arms with upturned portions on said operating crank, and a handle on one of said upturned portions, for the purpose set forth.

2. In a combination hay rake and stacker, the combination with a truck frame, of standards on said frame, arms pivoted to said standards, rake beams pivoted to said standards and projecting from said frame, a rake carried by said beams, means for raising and lowering said beams and rake, tilting arms connected with said rake and with said arms at one side of the arm pivots, and means connected with said arms at the opposite side of said pivots whereby said arms are rocked and the rake tilted, substantially as set forth.

3. In a combination hay rake and stacker, the combination of a truck frame, of standards supported near the rear of said frame, rake beams pivoted on said standards and projecting from the front of said frame, a rake carried by said beams, arms pivoted to said standards with portions projecting above and below the pivotal point, tilting arms pivoted to the upper ends of said arms and connected with said rake, an operating crank carried by said frame, and means connecting said crank with the lower ends of said arms, for the purpose set forth.

4. In a combination hay rake and stacker, the combination with a truck frame, of standards supported near the rear of said frame, rake beams pivoted on said standards and projecting from the front of said frame, a rake carried by said beams, arms pivoted to said standards with portions projecting above and below the pivotal point, tilting arms pivoted to the upper ends of said arms and connected with said rake, a revoluble rod anchored on said frame, upturned portions at the ends and center of said rod, links pivoted to said end upturned portions and to said arms, yokes on said links adapted for engagement with said end upturned portions, and a handle on said center upturned portion, substantially as set forth.

5. In a combination hay rake and stacker, the combination of a truck frame, comprising longitudinal and front and back cross bars, said longitudinal bars having horizontal perforations in their forward ends, rake beams pivoted on said frame and extending forwardly therefrom, blocks seated on said forward cross bar and supporting the loose ends of said rake beams, said blocks having perforations therein adapted to register with the perforations in said longitudinal bars, bolts extending through said perforations and securing said blocks in position, a rake connected with said rake beams, and means for raising and lowering said beams and rake.

6. In a combination hay rake and stacker, the combination with a truck frame, of rake beams pivotally mounted on said frame, a rake tiltably mounted on said beams, blocks on said frame adapted for supporting said beams and adapted for adjustment on said frame to vary the elevation of said rake, and means for raising and lowering said rake.

In testimony whereof we affix our signatures in presence of two witnesses.

AMOS B. CLIPPINGER.
MAURICE A. CLIPPINGER.

Witnesses:
HAROLD E. RICHARDS,
JOHN F. WADE.